(12) United States Patent
Kaikkonen et al.

(10) Patent No.: US 7,787,430 B2
(45) Date of Patent: Aug. 31, 2010

(54) POWER CONTROL FOR GATED UPLINK CONTROL CHANNEL

(75) Inventors: Jorma Kaikkonen, Oulu (FI); Anna-Mari Vimpari, Oulu (FI)

(73) Assignee: Nokia Corporation, Espoo (FI)

( * ) Notice: Subject to any disclaimer, the term of this patent is extended or adjusted under 35 U.S.C. 154(b) by 965 days.

(21) Appl. No.: 11/499,849

(22) Filed: Aug. 4, 2006

(65) Prior Publication Data
US 2007/0030838 A1 Feb. 8, 2007

Related U.S. Application Data

(60) Provisional application No. 60/705,829, filed on Aug. 5, 2005.

(51) Int. Cl.
*H04B 7/216* (2006.01)
(52) U.S. Cl. ............... 370/342; 370/335; 370/347; 455/522; 455/69; 455/450; 455/67.11
(58) Field of Classification Search ........... 370/335, 370/479, 347, 311; 455/522, 69, 450
See application file for complete search history.

(56) References Cited

U.S. PATENT DOCUMENTS

| | | | | | |
|---|---|---|---|---|---|
| 5,377,192 | A * | 12/1994 | Goodings et al. | ........... | 370/348 |
| 5,461,639 | A * | 10/1995 | Wheatley et al. | ........... | 370/342 |
| 5,542,111 | A * | 7/1996 | Ivanov et al. | ........... | 455/522 |
| 5,828,677 | A * | 10/1998 | Sayeed et al. | ........... | 714/774 |
| 5,946,320 | A * | 8/1999 | Decker | ........... | 370/428 |
| 6,058,106 | A * | 5/2000 | Cudak et al. | ........... | 370/313 |
| 6,285,886 | B1 * | 9/2001 | Kamel et al. | ........... | 455/522 |
| 6,298,241 | B1 * | 10/2001 | Hong | ........... | 455/522 |
| 6,396,867 | B1 * | 5/2002 | Tiedemann et al. | ........... | 375/141 |
| 6,606,313 | B1 * | 8/2003 | Dahlman et al. | ........... | 370/347 |
| 6,650,904 | B1 * | 11/2003 | Lin et al. | ........... | 455/522 |
| 6,697,343 | B1 * | 2/2004 | Kamel et al. | ........... | 370/311 |
| 6,871,078 | B2 * | 3/2005 | Nishioka et al. | ........... | 455/522 |
| 7,155,236 | B2 * | 12/2006 | Chen et al. | ........... | 455/454 |
| 7,324,785 | B2 * | 1/2008 | Hansen et al. | ........... | 455/69 |
| 7,414,989 | B2 * | 8/2008 | Kuchibhotla et al. | ........ | 370/329 |
| 7,447,504 | B2 * | 11/2008 | Lohr et al. | ........... | 455/450 |
| 7,653,856 | B2 * | 1/2010 | Ahn et al. | ........... | 714/748 |
| 7,693,110 | B2 * | 4/2010 | Love et al. | ........... | 370/332 |
| 2002/0003785 | A1 * | 1/2002 | Agin | ........... | 370/333 |
| 2002/0167907 | A1 * | 11/2002 | Sarkar et al. | ........... | 370/252 |
| 2003/0054849 | A1 * | 3/2003 | Koo et al. | ........... | 455/522 |
| 2003/0099211 | A1 * | 5/2003 | Moulsley et al. | ........... | 370/328 |

(Continued)

OTHER PUBLICATIONS

3GPP TS 25.214 version 6.6.0 Release 6—ETSI TS 125 214 V6.6.0 (Jun. 2005) Universal Mobile Telecommunications System (UMTS); Physical Layer Procedures (FDD).

(Continued)

*Primary Examiner*—Sharad Rampuria

(57) ABSTRACT

The specification and drawings present a new method, system, apparatus and software product for communications, e.g., wireless communications, for defining a power in a discontinuous control signal after a transmission gap for an uplink control channel, e.g., dedicated physical control channel (DPCCH), wherein the power in the discontinuous control signal after the transmission gap is determined, using a predetermined criterion, by control information (e.g., regarding an allowed power window) and by a length of a transmission gap for the uplink control channel or of a further transmission gap in an uplink discontinuous data signal.

33 Claims, 2 Drawing Sheets

U.S. PATENT DOCUMENTS

2004/0219920 A1* 11/2004 Love et al. .................. 455/442
2005/0213575 A1* 9/2005 Shin et al. ................... 370/389

OTHER PUBLICATIONS

3GPP TR 25.840 V4.0.0 (Dec. 2003) Technical Specification Group Radio Access Network; Terminal power saving features.

3GPP TR 25.214 V6.0.0 (Jun. 2005) Technical Specification Group Radio Access Network; Physical layer procedures (FDD).

"Gated Control Channel Transmission in WCDMA Forward Link" by Sami Salonen, Master's thesis, University of Oulu, Finland, 2002.

TR 101 112 V3.2.0. (Apr. 1998) UMTS 30.03 version 3.2.0, Universal Mobile Telecommunications System (UMTS); Selection procedures for the choice of radio transmission technologies of the UMTS (UMTS 30.03 version 3.2.0.).

* cited by examiner

POWER CONTROL FOR GATED UPLINK CONTROL CHANNEL

PRIORITY AND CROSS-REFERENCE TO RELATED APPLICATION

This application claims priority from U.S. Provisional Patent Application Ser. No. 60/705,829, filed on Aug. 5, 2005.

TECHNICAL FIELD

This invention generally relates to communications, e.g., wireless communications, and more specifically to defining a power in a discontinuous control signal for an uplink control channel.

BACKGROUND ART

In an uplink (a direction from a user equipment to a network), when no dedicated channels (DCHs) and no corresponding dedicated physical data channels (DPDCHs) are configured, all data is transmitted on an enhanced dedicated channel (E-DCH) which is mapped to an enhanced dedicated physical data channel (E-DPDCH). Control signaling associated with the E-DCH is transmitted on an enhanced dedicated physical control channel (E-DPCCH). The E-DPDCH and E-DPCCH can be discontinuous and are transmitted only when there is data to be transmitted and the transmission has been granted by the network. In the uplink, in addition to the E-DPDCH and E-DPCCH, a continuous dedicated physical control channel (DPCCH) and possibly a continuous or discontinuous dedicated physical control channel (e.g., Dedicated Physical Control Channel (uplink), HS-DPCCH) for an HS-DSCH (high speed downlink shared channel) are transmitted.

A packet service session contains one or several packet calls depending on the application as described in ETSI standard, TR 101 112, UMTS 30.03 "Selection procedures for the choice of radio transmission technologies of the UMTS", version 3.2.0. The packet service session can be considered as an NRT (non-real time) radio access bearer duration and the packet call as an active period of packet data transmission. During the packet call several packets may be generated, which means that the packet call constitutes a bursty sequence of packets. The burstiness is a characteristic feature of the packet transmission.

The arrival of session set-ups to the network can be modeled as a Poisson process. Reading time starts when the last packet of the packet call is completely received by the user and ends when the user makes a request for the next packet call. The E-DCH transmission in the uplink is discontinuous during a reading time, such that during most of the reading time there is no E-DCH transmission. Note, that depending on the packet arrival intervals (among other things), there could be gaps in the E-DCH) transmission during a packet call but the E-DCH transmission might also be continuous during the packet call. Thus, there can be some inactivity on the E-DCH also during a packet call.

In a UL direction from a user equipment (UE) to a network, also a signal on a high speed dedicated physical control channel (HS-DPCCH) can be transmitted. The HS-DPCCH signal typically carries 2 slots with channel quality indicator (CQI) reporting information and 1 slot with ACK/NACK information for the HSDPA. CQI transmission is typically periodic and normally independent of the HS-DSCH transmission activity. CQI reporting period can be controlled by a radio network controller (RNC) with possible values of 0, 2, 4, 8, 10, 20, 40, 80, and 160 ms. ACK/NACK is transmitted only as a response to a packet transmission on the HS-DSCH, which (similar to the E-DCH) is transmitted only when there is data to be transmitted and which depends on the reading time and packet arrival times during the packet call.

For the E-DCH transmission, a grant is needed: a non-scheduled grant for non-scheduled MAC-d (MAC stands for medium access control) flows and a serving grant (and allowed active hybrid automatic repeat request (HARQ) process) for a scheduled transmission. In the case of the scheduled MAC-d flows, a Node B controls when a user equipment (UE) is allowed to send and thus Node B knows when the UE is going to send. For the non-scheduled MAC-d flows, the network can allow a maximum number of bits that can be included in a MAC-e PDU (protocol data unit) for the given MAC-d flows. In case of 2 ms E-DCH TTI (transmission timing interval), each non-scheduled grant is applicable for a specific set of HARQ processes indicated by an RRC (radio resource control), and RRC can also restrict the set of HARQ processes for which scheduled grants are applicable. Also available power is needed for the E-DCH transmission, except for a minimum set (defined by the network), which defines a number of bits that can be transmitted on the E-DCH in the TTI also when there is not enough transmit power (provided there is no transport block sent on the DCH in the TTI).

The UL DPCCH carries control information generated at layer 1 (physical layer). The layer 1 control information consists of, e.g., known pilot bits to support channel estimation for coherent detection, transmit power control (TPC) for DL (downlink) DPCH (dedicated physical channel), feedback information (FBI) and optional transport format combination indicator (TFCI). Typically, the UL DPCCH is continuously transmitted (even if there is no data to be transmitted for certain time periods), and there is one UL DPCCH for each radio link. The continuous transmission is not a problem with circuit switched services, which are typically sent continuously. However, for bursty packet services, continuous DPCCH transmission causes a significant overhead.

The uplink capacity can be increased by decreasing a control overhead. One possibility for decreasing the control overhead is UL DPCCH gating (or discontinuous transmission), i.e., not transmitting signals on the DPCCH all the time.

Rationale for using gating includes (but is not limited to):
providing user equipment (UE) power savings and longer battery life;
providing interference reduction; and
providing higher capacity.

There is a fast closed loop power control for all uplink signals to combat against the power imbalance between different user signals and fast fading. The Node B, e.g., estimates continuously a signal-to-interference ratio (SIR) of the DPCCH transmitted by the UE and compares an estimate to a target value, and transmits transmit power control (TPC) commands in a downlink to the UE to increase or decrease the transmit power level. With the power control, the signals from different UEs can be received with the required quality in changing conditions.

During the uplink transmission gap the UL power control cannot operate as normally because Node B cannot estimate the received signal quality to determine the proper TPC command (the SIR would be extremely low, and normally generated TPC commands would tell the UE to increase the UL transmit power). Therefore the transmission power to be used after the gap needs to be estimated or predefined. Due to a user movement or a change in propagation conditions (fading) it is likely that in case of a long transmission gap that the power used prior to the gap is not sufficient to ensure a proper communication leading to increased usage of the HARQ or too excessive thus increasing a UL noise making the UL power control and scheduling of UL capacity (e.g., in case of a high speed uplink packet access, HSUPA) more difficult.

DISCLOSURE OF THE INVENTION

According to a first aspect of the invention, a method comprises: determining, using a predetermined criterion, a power in a discontinuous control signal for an uplink control channel after a transmission gap in the discontinuous control signal using a length of the transmission gap for the uplink control channel or of a further transmission gap in an uplink discontinuous data signal and control information; and transmitting the discontinuous control signal with the power after the transmission gap to a network element by a user equipment.

According further to the first aspect of the invention, the control information may be provided by the network element during the transmission gap.

Still further according to the first aspect of the invention, the control information may be at least partly defined using a previously used transmission power for the uplink control channel before the transmission gap.

According further to the first aspect of the invention, the control information may be defined or partly defined by a specification.

According still further to the first aspect of the invention, the control information may comprise at least one of: a) an allowed power window size, b) an allowed power window size adjustment, c) an allowed power window location, and d) an allowed power window location adjustment.

According further still to the first aspect of the invention, the determining of the power or defining the control information may further use a change in a downlink transmission quality estimated by the user equipment during the transmission gap. Further, the downlink transmission quality may be estimated using a common pilot channel received signal code power.

According yet further still to the first aspect of the invention, the determining of the power may further use an ACK/NACK signal received by the user equipment from the network element comprising an acknowledgement or a negative acknowledgement of the discontinuous control signal before the transmission gap.

Yet still further according to the first aspect of the invention, the determining of the power or defining the control information may further use an uplink interference change during the transmission gap provided by the network element to the user equipment.

Still yet further according to the first aspect of the invention, the uplink control channel may be an uplink dedicated physical control channel or the data channel may be an enhanced dedicated channel.

Still further still according to the first aspect of the invention, the network element may be a Node B and the network element and the user equipment may be configured for wireless communications.

According further still to the first aspect of the invention, the determining may be provided by the network element or by the user equipment.

According to a second aspect of the invention, a computer program product comprising: a computer readable storage structure embodying computer program code thereon for execution by a computer processor with the computer program code, wherein the computer program code comprises instructions for performing the first aspect of the invention, indicated as being performed by any component or a combination of components of the user equipment or the network element.

According to a third aspect of the invention, a user equipment, comprises: an
uplink signal generating module, for generating a discontinuous control signal for an uplink control channel; and a receiving/transmitting/processing module, for transmitting the discontinuous control signal to the network element, wherein a power of the discontinuous control signal after a transmission gap for the uplink control channel is determined, using a predetermined criterion, depending on control information and on a length of the transmission gap or of a further transmission gap in an uplink discontinuous data signal.

According further to the third aspect of the invention, the control information may be provided by the network element during the transmission gap to the receiving/transmitting/processing module.

Still further according to the third aspect of the invention, the control information may be at least partly defined using a previously used transmission power for the uplink control channel before the transmission gap.

According further to the third aspect of the invention, the equipment may further comprise: a DL quality estimating block, for estimating a change in a downlink transmission quality to determine the power. Further, the downlink transmission quality may be estimated using a common pilot channel received signal code power.

According still further to the third aspect of the invention, the control information may comprise at least one of: a) an allowed power window size, b) an allowed power window size adjustment, c) an allowed power window location, and d) an allowed power window location adjustment.

According yet further still to the third aspect of the invention, the power may be determined by further using an ACK/NACK signal received by the user equipment from the network element comprising an acknowledgement or a negative acknowledgement of the discontinuous control signal before the transmission gap.

According further still to the third aspect of the invention, the power may be determined or the control information may be defined by further using an uplink interference change during the transmission gap provided by the network element to the user equipment.

Yet still further according to the third aspect of the invention, the uplink control channel may be an uplink dedicated physical control channel and the data channel may be an enhanced dedicated channel.

Still yet further according to the third aspect of the invention, the power may be determined and provided by the network element.

Still further still according to the third aspect of the invention, the uplink scheduling and signal generating module may be configured to determine the power.

Yet still further according to the third aspect of the invention, the user equipment may be configured for wireless communications.

Still yet still further according to the third aspect of the invention, an integrated circuit may comprise the uplink signal generating module and the receiving/transmitting/processing module.

According to a fourth aspect of the invention, a user equipment comprises: means for signal generation, for generating a discontinuous control signal for an uplink control channel; and means for receiving and transmitting, for transmitting the discontinuous control signal to the network element, wherein a power of the discontinuous control signal after a transmission gap for the uplink control channel is determined, using a predetermined criterion, depending on control information and on a length of the transmission gap or of a further transmission gap in an uplink discontinuous data signal.

According further to the fourth aspect of the invention, the means for signal generation may be configured to determine the power.

According to a fifth aspect of the invention, the communication system, comprises: a user equipment, for transmitting a discontinuous control signal on an uplink control channel to a network element; and a network element, responsive to the discontinuous control signal, wherein determining a power in the discontinuous control signal after the transmission gap is implemented using a predetermined criterion and depending on control information and a length of the transmission gap for the uplink control channel or of a further transmission gap in an uplink discontinuous data signal.

According further to the fifth aspect of the invention, the determining of the power may be provided by the network element or by the user equipment.

Further according to the fifth aspect of the invention, the uplink control channel may be an uplink dedicated physical control channel and the data channel may be an enhanced dedicated channel.

Still further according to the fifth aspect of the invention, the control information may be provided by the network element during the transmission gap.

According further to the fifth aspect of the invention, the determining of the power may further use an ACK/NACK signal received by the user equipment from the network element comprising an acknowledgement or a negative acknowledgement of the uplink transmission before the transmission gap.

According to a sixth aspect of the invention, a network element, comprises: an uplink power planning module, for providing control information for a discontinuous control signal for an uplink control channel; a transmitter block, for transmitting the determined power of the discontinuous control signal to a user equipment; and a receiving block, for receiving the discontinuous data signal and the discontinuous control signal, wherein a power of the discontinuous control signal after a transmission gap for the uplink control channel is determined, using a predetermined criterion, depending on the control information and on a length of the transmission gap or of a further transmission gap in an uplink discontinuous data signal.

According further to the sixth aspect of the invention, the uplink power planning module may be configured to provide the power.

Further according to the sixth aspect of the invention, the uplink power planning module may be configured to provide the control information and wherein the control information comprises at least one of: a) an allowed power window size, b) an allowed power window size adjustment, c) an allowed power window location, and d) an allowed power window location adjustment.

MODES FOR CARRYING OUT THE INVENTION

Figure 1:
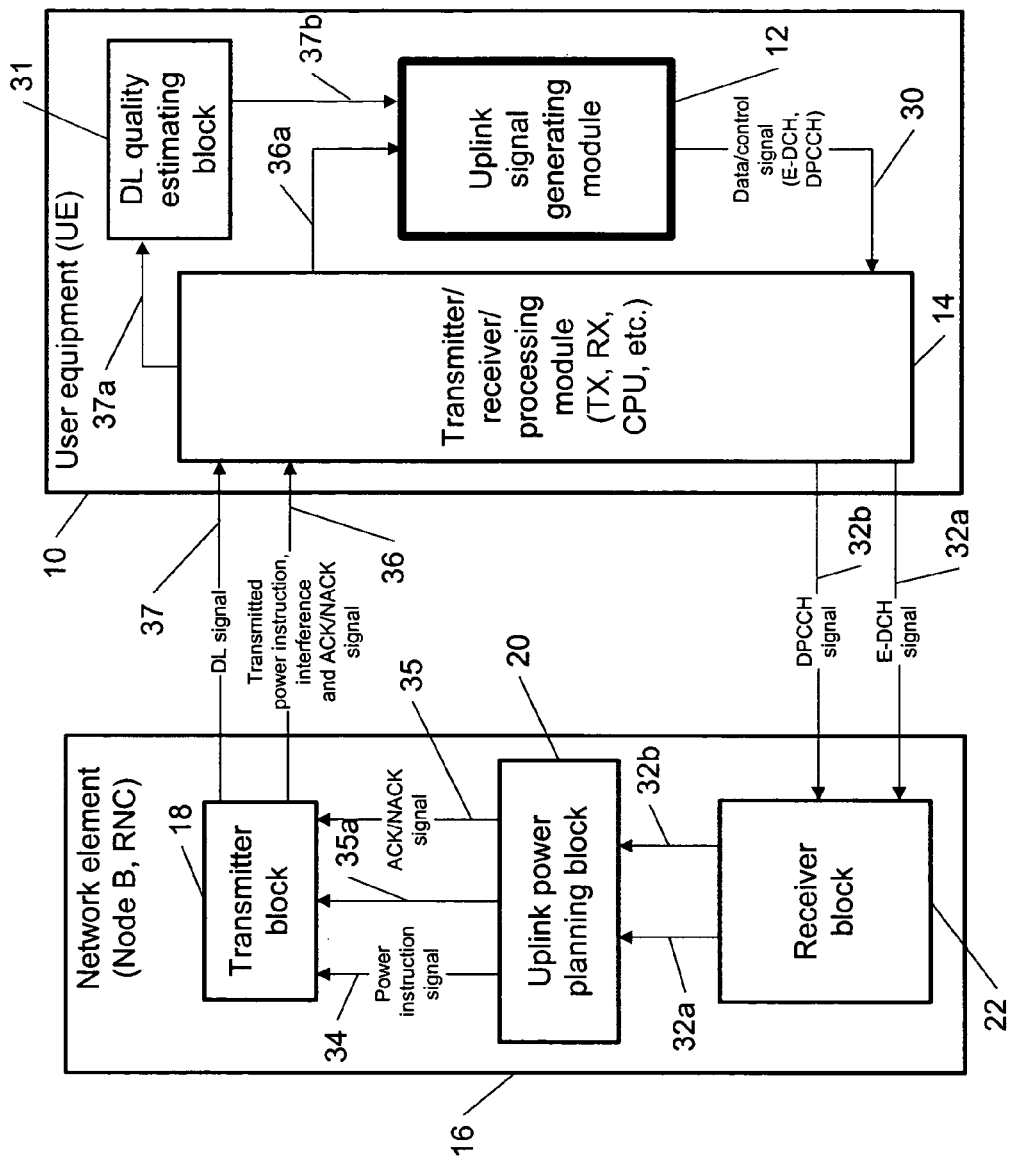
FIG. 1 is a block diagram which demonstrates determining a power in a discontinuous control signal after a transmission gap for a dynamic uplink (UL) dedicated physical control channel (DPCCH), according to an embodiment of the present invention.

A new method, system, apparatus and software product are presented for communications, e.g., wireless communications, for defining a power in a discontinuous control signal after a transmission gap for an uplink (UL) control channel, e.g., a dedicated physical control channel (DPCCH), wherein the power (e.g., the initial transmission power) in the discontinuous control signal (e.g., a DPCCH signal) after the transmission gap is determined, using a predetermined criterion, by control information (e.g., regarding allowed power window having a size and a location) and by a length of the transmission gap for the UL control channel or of a further transmission gap in an uplink discontinuous data signal, e.g., transmitted on an enhanced dedicated channel (E-DCH). The control information can be defined (e.g., adjusted) by a network (e.g., in the beginning of a communication event) and/or can be defined in a specification.

The control information (e.g., allowed power window parameters) can comprise (but may not be limited to):

- an allowed power window size PW_size, i.e., a range or a size of the allowed power window, e.g., expressed as ±number of dB from a mid point,
- an allowed power window size adjustment (step size) PW_size adj indicating an allowed power window increase,
- an allowed power window location PW_location, e.g., indicating a midpoint of the allowed power window,
- an allowed power window location adjustment PW_location_adj, indicating the amount by the allowed power window location can be increased/decreased during the transmission gap, i.e., the total change which could be defined according to the control information and the transmission gap length, e.g. a transmission gap length dependent coefficient/factor/scaling indicating how much the control information may impact on the allowed power window location during the transmission gap For example, with a power level in the discontinuous control signal before the transmission gap P_before_gap, PW_size after adjustment (after the transmission gap) would be PW_size+PW_size_adj=PW_size' and PW_location after adjustment (after transmission gap) would be P_before_Gap+PW_location_adj. Then an initial power after the transmission gap could be selected within the limits: P_before_Gap+PW_location_adj−PW_size' and P_before_Gap+PW_location_adj+PW_size'.

It is also noted that the control information can comprise other power parameters, e.g., step size for an absolute power change in the discontinuous control signal after a transmission gap. It is further noted that in a special case of small (0-1 dB) allowed power window size, the power level and the allowed power window location are substantially the same from a practical point of view.

The allowed power window parameters can be fixed (e.g., defined in the specification) and/or provided (e.g., adjusted) by a network element during the transmission gap, or the allowed power window parameters can be defined based on a previously used transmission power for the uplink control channel immediately before the transmission gap, on estimating a downlink quality change during the transmission gap and possibly on a further control provided by the network element or, generally, it can be chosen using a further predefined algorithm (e.g., with a combination approach using partly the previously used transmission power for the uplink control channel immediately before the transmission gap, and possibly partly estimate of the downlink quality change during the transmission gap, and possibly partly the network control during the transmission gap, and possibly partly the transmission gap length). It is noted that, according to embodiments of the present invention, determining of the power can be controlled by a network element and performed by a user equipment.

According to further embodiments of the present invention, the determining of the power can additionally use a change in a downlink transmission quality (e.g., a relative change in the downlink transmission quality) estimated by the user equipment during the transmission gap in the UL. For example, estimating of the downlink transmission quality can be performed using a common pilot channel (CPICH) received signal code power (RSCP). The initial uplink transmission power after the gap could be adjusted to be higher or lower depending on the change occurred (increase/decrease) in estimated DL quality samples prior to the gap and by the end of the gap. This can offer information on the change of the long term signal quality (e.g., pathloss and shadowing). Moreover, according to an embodiment of the present invention, the determining of the power can further use an ACK/NACK signal received by the user equipment comprising an acknowledgement or a negative acknowledgement of the discontinuous transmission before the transmission gap for the UL control channel. E.g., if the UE has received the negative acknowledgement (NACK), it indicates that the used transmission power has not been sufficient. This can be then accounted by adjusting the power of a next transmission to be higher (in case of a re-transmission or a new packet). Furthermore, the determining of the power can additionally use a control provided by the network element to the user equipment during the uplink DPCCH transmission gap. The control can be based, e.g., on an uplink interference change during the transmission gap. The control can be provided using, e.g., TPC bits on a downlink fractional dedicated physical channel (F-DPCH) or the downlink dedicated physical control channel (DPCCH) during the uplink DPCCH transmission gap.

The allowed power window parameters after the transmission gap in the DPCCH transmission can be signaled to the user equipment (UE), e.g., by the network element such as a Node B and/or it could be partly selected by the UE based on a length of the transmission gap in the DPCCH transmission and/or based on further predefined algorithm. If it is signaled, the allowed power window parameters in the UE can be controlled by the Node B with the DL TPC (transmit power control) bits transmitted during the UL DPCCH transmission gap. At the end of the transmission gap when the UE reinitiates its transmission, the allowed power window parameters can indicate the acceptable power range in which the UE is allowed to start its transmission. The initial power level within the allowed power window is determined using embodiments of the present invention described above.

Thus during (at the beginning of) the UL (e.g., UL DPCCH) transmission gap, the UE can select an initial allowed power window based on the transmission power used prior to the gap and/or based on the received signaling depending on the transmission gap length. The size and location of the allowed power window could be adjusted dynamically depending on the transmission gap length, and the rate and speed of the change could be signaled by the network element. For example, for a longer transmission gap it can be more beneficial to have a larger adjustment step size and for a shorter transmission gap it can be more beneficial to have no adjustment or a small adjustment step. This way the allowed power window can be adjusted based on expected UL load (variation) conditions (few/many users) and operation environments (small cell/large cell).

Moreover, according to further embodiments of the present invention, determining of the allowed power window (and/or the allowed window location adjustment) after the transmission gap in the DPCCH transmission can optionally use further predefined algorithm based on (but not limited to): a) the change in the downlink transmission quality (e.g., the relative change in the downlink transmission quality) estimated by the user equipment during the transmission gap; b) the ACK/NACK signal received by the user equipment comprising an acknowledgement or a negative acknowledgement of the discontinuous transmission before the transmission gap for the UL control channel (e.g., UL DPCCH); and c) the uplink interference change (e.g., UL noise rising conditions) provided by the network element to the user equipment. Optionally, according to a further embodiment, the allowed power window for the transmit power after the transmission gap could be adjusted only during the transmission gap and the transmission power used during the transmissions would not affect it. Impact of the change in the downlink transmission quality on the allowed power window or on the power in the discontinuous control signal can depend on the transmission gap length.

The downlink transmission quality estimated by the user equipment during the transmission gap can include pathloss and shadowing based on measured (long term average) difference in the DL signal quality using, e.g., a common pilot channel (CPICH) received signal code power (RSCP). For instance, if during the transmission gap the estimated pathloss has increased, the initial transmission power could be also increased. The allowed power window can be also adjusted accordingly based on this information. For example, if initially the power used prior to the transmission gap would have been at a certain relative position within the allowed power window, the initial transmission power after the transmission gap would be set at a relatively higher position within the allowed power window. More specifically, assuming that a path loss change during the transmission gap is $-m$, the transmission power prior to the transmission gap is $x$, and the initial allowed power window is $[x+y, x-y]$ with a relative position $R=(x+y)/2y$, then the initial transmitter power relative position after the transmission gap is given by $R'=(x+y+m)/2y$, leading to the power after the transmission gap given by $AW_{LowerLimit}+AW_{size}*R$, where $AW_{LowerLimit}$ is the lower limit for the allowed power window and $AW_{size}$ is the size of the allowed power window. It is noted that depending on the situation, the power after the transmission gap can be adjusted up or down.

Similar considerations can be applied to the ACK/NACK signal (described above) received by the user equipment. For example, in case of receiving the NACK signal, to packet transmitted in the UL control channel prior to the transmission gap can be determined similarly as above, e.g., by adjusting the initial transmission power relative position within the allowed power window to be higher than the relative transmission power prior to the transmission gap.

Moreover, according to further embodiments of the present invention, the interpretation of DL TPC commands could be different for the case when the UE is actually transmitting and during the transmission gap. When the UE transmits (e.g., on the DPCCH) to the uplink, the Node B could control the UE transmit power in a traditional way by adjusting the actual UE transmit power. During the gaps, however, the DL TPC commands would be used to adjust the location of the allowed power window, which location could be initially set relative to the last transmission power used prior to the transmission gap. Optionally the position of the allowed power window for initial transmit power could be adjusted only during the transmission gaps and the transmission power used during the transmissions would not affect its location.

Furthermore, according to embodiments of the present invention, simple rules can be applied such that the UE can autonomously increase the allowed window size (which initially during the transmission gap can be possibly controlled by downlink signaling from the network) by a predetermined value (e.g., 1 dB) if the gap length would exceed a pre-defined gap length threshold, and moreover, if the transmission gap length would exceed another pre-defined gap length threshold, the UE would autonomously increase the allowed window size by a further predetermined value (e.g., 2 dB) compared to the initial (network controlled) allowed window size, etc. Similar rules can be applied to determining the power within the allowed power window for the discontinuous control signal by the UE.

It is noted that all embodiments of the present invention described above for the uplink control channel, e.g., the DPCCH, can be applied to any L1 control channel in the UL (carrying, e.g., pilot and/or power control information) used for, e.g., channel estimation and power control. It is also noted, that defining a power in a discontinuous control signal can be performed by the UE or by the network element, according to embodiments of the present invention. It is further noted that various embodiments of the present invention recited herein can be used separately, combined or selectively combined for specific applications.

FIG. 1 shows a block diagram of an example among others which demonstrates determining the power in the discontinuous control signal after the transmission gap for the dynamic uplink (UL) control channel, e.g., the dedicated physical control channel (DPCCH).

In the example of FIG. 1, a user equipment 10 comprises an uplink signal generating module 12 and a transmitter/receiver/processing module 14 and a DL quality estimating block 31. In one embodiment of the present invention, the module 12 can coordinate and originate steps performed by the user equipment 10 for defining the power for the discontinuous LL DPCCH. The user equipment 10 can be a wireless device, a portable device, a mobile communication device, a mobile phone, etc. In the example of FIG. 1, a network element 16 (e.g., a node B or a radio network controller, RNC) comprises a transmitter block 18, an uplink power planning block 20 and a receiver block 22. According to an embodiment of the present invention, the uplink power planning block 20 can provide a power instruction signal 34 (further provided using signals 36 and 36a) which can be the allowed power window or a control for the allowed power window or a control for the power for the UL DPCCH transmission after the transmission gap determined by the network element, ACK/NACK signal 35, (further provided using signals 36 and 36a) comprising the acknowledgement or the negative acknowledgement of the discontinuous transmission before the transmission gap for the UL control channel, an interference signal 35a (further provided using signals 36 and 36a) comprising the uplink interference change (thus additionally providing the control of the power for the UL DPCCH transmission) during the transmission gap, and a DL signal 37 (further provided using signal 37a), to the user terminal 10. Note, that in an alternative embodiment, the signal 35a can be combined with the signal 34, i.e., the uplink interference change can be added to the commands/instructions contained in the signal 34.

According to the present invention, the module 12 (the same is applicable to the blocks 31 and 20) can be implemented as a software or a hardware block or a combination thereof. Furthermore, the module 12 can be implemented as a separate block or can be combined with any other standard block of the user equipment 10 or it can be split into several blocks according to their functionality. The transmitter/receiver/processing block 14 can be implemented in a plurality of ways and typically can include a transmitter, a receiver, a CPU (central processing unit), etc. The module 14 provides an effective communication of the module 12 with the network element 16 as described below in detail. All or selected blocks and modules of the user equipment 10 can be implemented using an integrated circuit, and all or selected blocks of the network element 16 can be implemented using an integrated circuit as well.

The module 12 provides a data/control signal 30, according to embodiments of the present invention, which is then forwarded (signals 32a and 32b) to the receiver block 22 of the network element 16 and further (optionally) to the uplink power planning block 20. Specifically, the module 12 can provide a discontinuous data signal (e.g., an E-DCH signal 32a) and a DPCCH signal 32b for an uplink (UL) dedicated physical control channel (DPCCH), wherein the power in the DPCCH signal 32b after the transmission gap is determined, using a predetermined criterion (as described above), by instructions (comprising the allowed power window) provided by a network element 16 (see signals 34, 36 and 36a).

According to one embodiment of the present invention, the determining of the power in the signal 32b can be performed using the module 12. Moreover, the determining of said power can additionally (optionally) utilize the downlink transmission quality (e.g., using the CPICH RSCP) change estimated by the block 31 of the user equipment 10 during the transmission gap (see signals 37, 37a and 37b). Furthermore, the determining of said power can additionally (optionally) utilize an ACK/NACK (see signals 35, 36 and 36a) received by the user equipment 10 comprising the acknowledgement or the negative acknowledgement of the discontinuous transmission of the DPCCH signal 32b before the transmission. Also, the controlling of said power can additionally (optionally) utilize the uplink interference change during the transmission (see signals 35a, 36 and 36a). It is noted that adjusting the UL DPCCH power according to embodiments of the present invention can automatically provide the adjustment for the E-DPDCH and E-DPCCH power because according to the current specification (3GPP TS25.213 and TS25.214) the E-DPDCH and E-DPCCH powers are defined as relative to the DPCCH power.

Optionally, according to a further embodiment of the present invention, determining the power in the DPCCH signal 32b can be performed by a network element 16 (e.g., by the block 20) and forwarded to the user equipment 10 in the power instruction signal 34 (followed by the signals 36 and 36a).

It is noted that the network element 16, for the purposes of understanding of various embodiments of the present invention, can be broadly interpreted such that the network element 16 can comprise features attributed to both the Node B and the radio network controller (RNC). Specifically, the module 20 can be located in the RNC (then the signaling from the RNC is forwarded to the user equipment by the Node B) or in the Node B, whereas the block 22 is located in the Node B.

Figure 2:
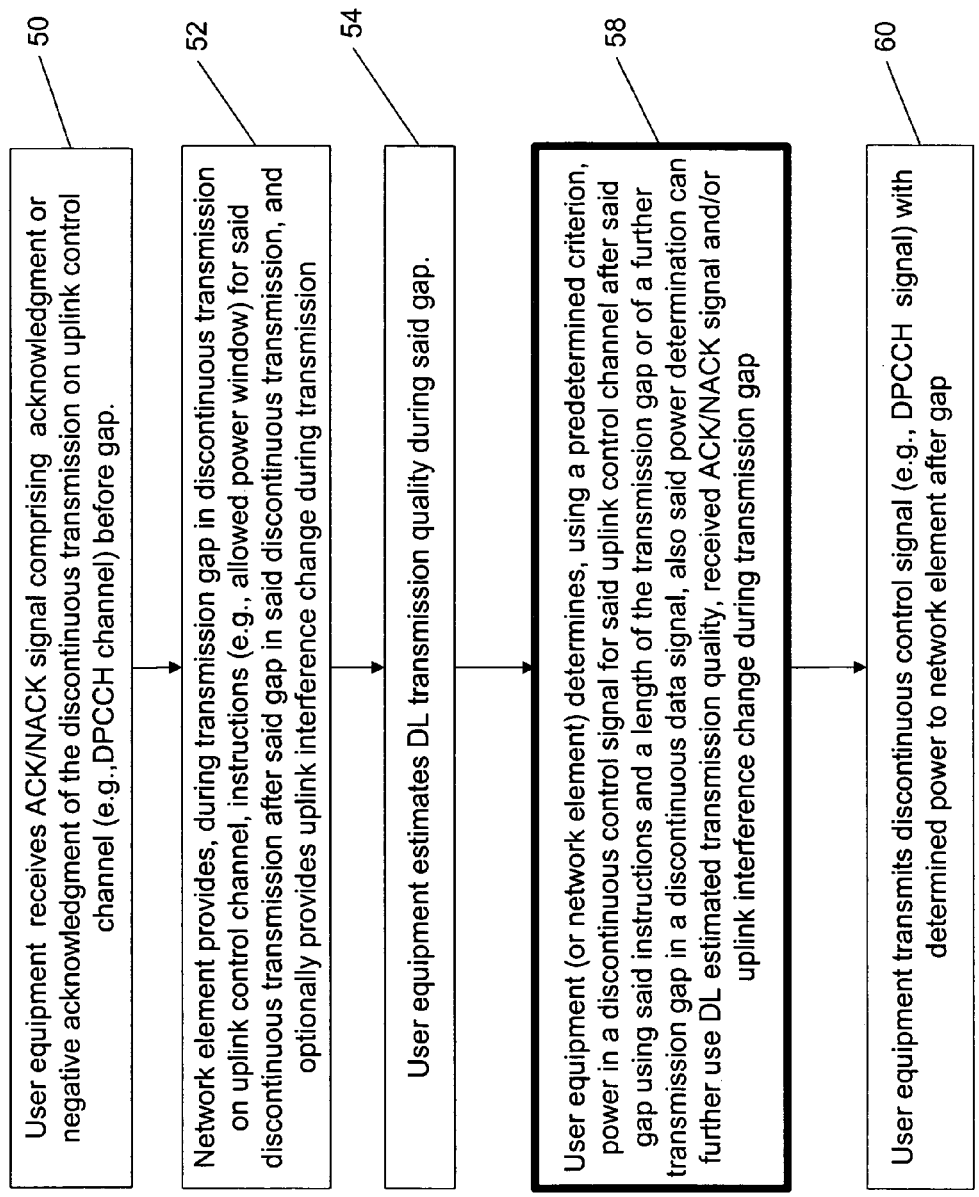
FIG. 2 is a flow chart which demonstrates determining a power in a discontinuous control signal after a transmission gap for a dynamic uplink (UL) dedicated physical control channel (DPCCH), according to an embodiment of the present invention.

FIG. 2 is an example of a flow chart determining the power in a discontinuous control signal after the transmission gap for the dynamic uplink (UL) dedicated physical control channel (DPCCH), according to an embodiment of the present invention.

The flow chart of FIG. 2 only represents one possible scenario among others. Also the order of steps shown in FIG. 2 is not absolutely required, so generally, the various steps can be performed out of order. In a method according to an embodiment of the present invention, in a first step 50, the user equipment 10 receives the ACK/NACK signal (see signals 35, 36 and 36a) comprising the acknowledgement or the negative acknowledgement of the discontinuous transmission on the uplink control channel (e.g., the DPCCH channel) before the transmission gap.

In a next step 52, the network element 16 provides, during the transmission gap in the discontinuous transmission on the uplink control channel, the power instructions (e.g., the allowed power window) for the discontinuous transmission after the transmission gap in said discontinuous transmission, and optionally the network element 16 provides uplink interference change during the transmission gap (see signals 35a, 36 and 36a). In a next step 54, the user equipment 10 can estimate the DL transmission quality during said gap (see signals 37, 37a and 37b) using the block 31.

In a next step 58, the user equipment 10 (or the network element 16) determines, using the predetermined criterion, the power in the discontinuous control signal (the DPCCH signal 32b) for the uplink control channel after the transmission gap using the instructions (the allowed power window) and the length the transmission gap for the UL control channel (e.g., for the DPCCH) or for the further transmission gap in the discontinuous data signal (e.g., the E-DCH signal 32a). Also the power determination can further use the DL estimated transmission quality (see signals 37, 37a and 37b), the received ACK/NACK signal (see signals 35, 36 and 36a), and/or the uplink interference change during the transmission (see signals 35a, 36 and 36a).

Finally, in a step 60, the user equipment 10 transmits the discontinuous control signal (e.g., the DPCCH signal 32b) with the determined power to the network element 16 after the transmission gap.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   determining a power adjustment including one of an up, down, and no power adjustment in a discontinuous control signal for an uplink control channel after a transmission gap in said discontinuous control signal using a length of the transmission gap for the uplink control channel or of a further transmission gap in an uplink discontinuous data signal and control information; and
   transmitting said discontinuous control signal with said power after said transmission gap to a network element by a user equipment wherein the control information comprises at least one of:
   a) an allowed power window size,
   b) an allowed power window size adjustment,
   c) an allowed power window location, and
   d) an allowed power window location adjustment.

2. The method of claim 1, wherein said control information is provided by said network element during said transmission gap.

3. The method of claim 1, wherein said control information is at least partly defined using a previously used transmission power for the uplink control channel before said transmission gap.

4. The method of claim 1, wherein the control information is defined or partly defined by a specification.

5. The method of claim 1, wherein said determining of said power or defining said control information further uses a change in a downlink transmission quality estimated by said user equipment during said transmission gap.

6. The method of claim 5, wherein said downlink transmission quality is estimated using a common pilot channel received signal code power.

7. The method of claim 1, wherein said determining of said power further uses an ACK/NACK signal received by the user equipment from said network element comprising an acknowledgement or a negative acknowledgement of said discontinuous control signal before said transmission gap.

8. The method of claim 1, wherein said determining of said power or defining said control information further uses an uplink interference change during said transmission gap provided by said network element to said user equipment.

9. The method of claim 1, wherein said uplink control channel is an uplink dedicated physical control channel or said data channel is an enhanced dedicated channel.

10. The method of claim 1, wherein said network element is a Node B and said network element and said user equipment are configured for wireless communications.

11. The method of claim 1, wherein said determining is provided by said network element or by said user equipment.

12. A non-transitory computer readable storage structure embodying computer program code thereon for execution by a computer processor with said computer program code, wherein said computer program code comprises instructions for performing the method of claim 1, indicated as being performed by any component or a combination of components of said user equipment or said network element.

13. A user equipment, comprising:
   an uplink signal generating module, for generating a discontinuous control signal for an uplink control channel; and
   a receiving/transmitting/processing module, for transmitting said discontinuous control signal to said network element,
   wherein one of an up, down, or no power adjustment of a power of said discontinuous control signal after a transmission gap for the uplink control channel is determined depending on control information and on a length of said transmission gap or of a further transmission gap in an uplink discontinuous data signal wherein the control information comprises at least one of:
   a) an allowed power window size,
   b) an allowed power window size adjustment,
   c) an allowed power window location, and
   d) an allowed power window location adjustment.

14. The user equipment of claim 13, wherein said control information is provided by said network element during said transmission gap to said receiving/transmitting/processing module.

15. The user equipment of claim 13, wherein said control information is at least partly defined using a previously used transmission power for the uplink control channel before said transmission gap.

16. The user equipment of claim 13, further comprises:
a DL quality estimating block, for estimating a change in a downlink transmission quality to determine said power.

17. The user equipment of claim 16, wherein said downlink transmission quality is estimated using a common pilot channel received signal code power.

18. The user equipment of claim 13, wherein said power is determined by further using an ACK/NACK signal received by the user equipment from said network element comprising an acknowledgement or a negative acknowledgement of said discontinuous control signal before said transmission gap.

19. The user equipment of claim 13, wherein said power is determined or said control information is defined by further using an uplink interference change during said transmission gap provided by said network element to said user equipment.

20. The user equipment of claim 13, wherein said uplink control channel is an uplink dedicated physical control channel and said data channel is an enhanced dedicated channel.

21. The user equipment of claim 13, wherein said power is determined and provided by said network element.

22. The user equipment of claim 13, wherein said uplink signal generating module is configured to determine said power.

23. The user equipment of claim 13, wherein said user equipment is configured for wireless communications.

24. The user equipment of claim 13, wherein an integrated circuit comprises the uplink signal generating module and the receiving/transmitting/processing module.

25. A user equipment, comprising:
means for signal generation, for generating a discontinuous control signal for an uplink control channel; and
means for receiving and transmitting, for transmitting said discontinuous control signal to said network element,
wherein one of an up, down, or no power adjustment of power of said discontinuous control signal after a transmission gap for the uplink control channel is determined, using a predetermined criterion, depending on control information and on a length of said transmission gap or of a further transmission gap in an uplink discontinuous data signal wherein the control information comprises at least one of:
a) an allowed power window size,
b) an allowed power window size adjustment,
c) an allowed power window location, and
d) an allowed power window location adjustment.

26. The user equipment of claim 25, wherein said means for signal generation is configured to determine said power.

27. A communication system, comprising:
a user equipment, for transmitting a discontinuous control signal on an uplink control channel to a network element; and
a network element, responsive to said discontinuous control signal,
wherein determining one of an up, down, or no power adjustment of power in said discontinuous control signal after said transmission gap is implemented using a predetermined criterion and depending on control information and a length of the transmission gap for the uplink control channel or of a further transmission gap in an uplink discontinuous data signal wherein the control information comprises at least one of:
a) an allowed power window size,
b) an allowed power window size adjustment,
c) an allowed power window location, and
d) an allowed power window location adjustment.

28. The system of claim 27, wherein the determining of said power is provided by said network element or by said user equipment.

29. The system of claim 27, wherein said uplink control channel is an uplink dedicated physical control channel and said data channel is an enhanced dedicated channel.

30. The system of claim 27, wherein said control information is provided by said network element during said transmission gap.

31. The system of claim 27, wherein said determining of said power further uses an ACK/NACK signal received by the user equipment from said network element comprising an acknowledgement or a negative acknowledgement of said uplink transmission before said transmission gap.

32. A network element, comprising:
an uplink power planning module, for providing control information for a discontinuous control signal for an uplink control channel;
a transmitter block, for transmitting said determined power of said discontinuous control signal to a user equipment; and
a receiving block, for receiving said discontinuous data signal and said discontinuous control signal,
wherein one of an up, down, or no power adjustment of power of said discontinuous control signal after a transmission gap for the uplink control channel is determined, using a predetermined criterion, depending on said control information and on a length of said transmission gap or of a further transmission gap in an uplink discontinuous data signal wherein said an uplink power planning module is configured to provide said control information and wherein the control information comprises at least one of:
a) an allowed power window size,
b) an allowed power window size adjustment,
c) an allowed power window location, and
d) an allowed power window location adjustment.

33. The network element of claim 32, wherein said an uplink power planning module is configured to provide said power.

* * * * *